Sept 17, 1957        L. J. ANDY          2,806,502
              ANTI-SKID VEHICLE TIRE
                Filed March 22, 1954
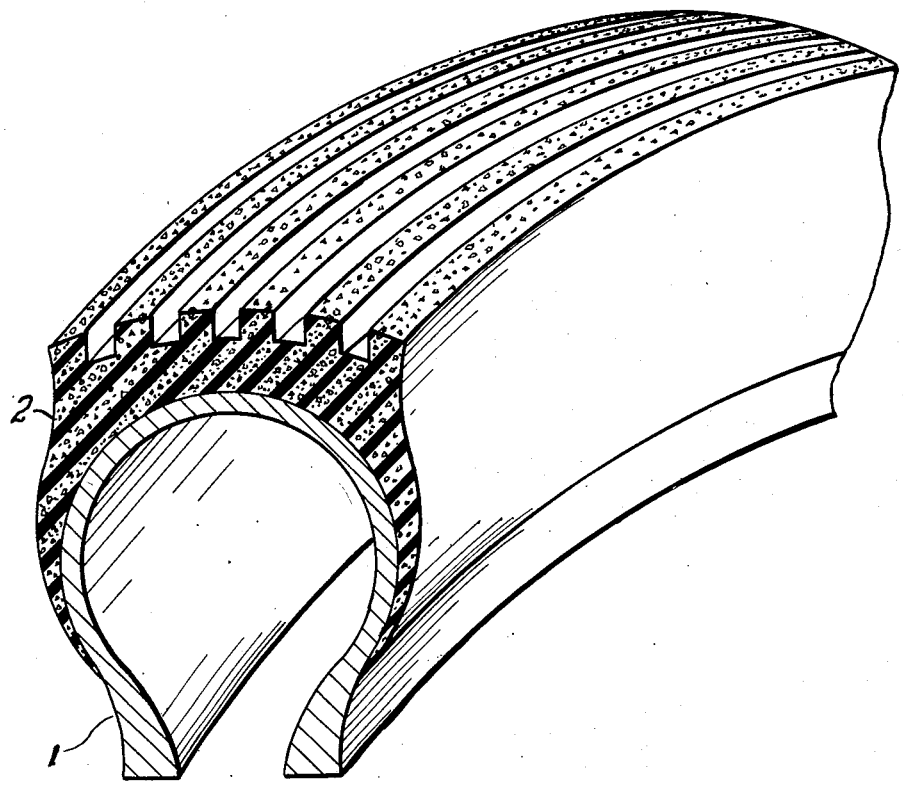
                                    INVENTOR.
                              LOUIS J. ANDY
                           BY
                              William J. Ruano
                                  ATTORNEY 2,806,502
Patented Sept. 17, 1957

2,806,502
ANTI-SKID VEHICLE TIRE

Louis J. Andy, Washington, Pa., assignor to Andy Bros. Tire Shop, Washington, Pa., a partnership Application March 22, 1954, Serial No. 417,741

1 Claim. (Cl. 152—211)

This invention releates generally to an anti-skid rubber composition, and more particularly to a composition including hard fibrous material interspersed in rubber and useful to provide anti-skid qualities in articles such as vehicle tires, floor tile, shoe soles and heels, stair treads and other tread surfaces.

In the past, hard fibrous materials in the form of wood chunks have been used for making vehicle tires such as disclosed in Gapen et al. Patent Reissue No. 23,135, dated July 19, 1949. However, after extensive tests, it has been found that such compositions reduce the life of the tire by a substantial amount, in the neighborhood of 30 to 40 percent or more. For this reason such compositions have been used only for recapping for winter use, and upon reaching spring weather such tires have been generally removed and replaced by rubber tires so as to obtain satisfactory wear and sufficiently long life for spring, summer and fall driving.

In accordance with my invention I have provided an anti-skid composition useful for tires and other purposes and which is devoid of the above disadvantages of known tread compositions and which provides a life for a tire substantially the same as that of one of pure rubber. More specifically, I have found an unexpected and critical range of percentages which provides a remarkable and amazing increase in anti-skid qualities in wet weather without any noticeable decrease in the life of a tire.

Another object of my invention is to provide an anti-skid composition that is useful for tread surfaces such as rubber floor tile, flooring, mats, crutch and cane tips, brake pedals, safety shoes for ladders, and the like, or for use in the making of shoe soles or heels, which will considerably reduce skid when used on wet surfaces without reducing the life of the composition.

Other objects and advantages of my invention will become apparent from a study of the following description taken with the accompanying drawing wherein the single figure is a fragmentary prospective view, in cross section, of a vehicle tire having a rubber tread embodying an anti-skid composition in accordance with the present invention.

Referring more particularly to the drawing, numeral 1 denotes an ordinary vehicle tire carcass upon the exterior surface of which is molded a covering body or tread 2 of material such as natural or synthetic rubber, or compounds thereof, cured and having interspersed therein hard fibrous particles, such as hard or soft wood particles, walnut shells or other nut shells, corn cobs and similar vegetable fibers which are hard and durable. I have made the amazing discovery that when hard fibrous particles of a particular mesh or screen size are added to either pure or synthetic rubber, or rubber compounds, and kept within very critical limits namely between 2 percent and 12 percent by weight of the rubber, that amazing anti-skid characteristics are provided with no noticeable decrease in the life of the tire or other tread composition. When this percentage is reduced below 2 percent, the anti-skid quality practically disappears, and when increased above 12 percent the life of the tire is considerably reduced without any appreciable increase in anti-skid characteristics. The optimum percentage by weight of anti-skid particles, such as wood, is between 5 percent and 7 percent, which gives a very critical increase in anti-skid qualities with practically no reduction in the life of the composition as compared to that of pure rubber or rubber compound ordinarily used for making vehicle tires. It should be noted that the anti-skid characteristics mentioned herein are those in connection with wet surfaces, such as wet roads caused by rain or melting snow, and not in connection with ice or snow, which is the type of surface contemplated by winter anti-skid tires.

The hard fibrous materials are preferably in the form of chunks or irregular cubes with corners and edges, although they may also include splinters, slivers or shavings. The critical anti-skid characteristics of my invention are obtained not only by restricting the percentage, by weight, to a narrow range, but in choosing the proper screen size which I have found to be between 8 and 30 mesh standard gage (8 mesh meaning 8 wires of the screen to an inch). But for most optimum results, I have found that about a 16 mesh screen size gives the most outstanding results, both in anti-skid and long life.

Therefore to obtain an anti-skid composition, such as for use in vehicle tires having a critically high degree of anti-skid in wet weather with practically no reduction in life, the composition should comprise about 5 to 7 percent by weight of the hard fibrous particles and a screen size of about No. 16, and the particles should be substantially dispersed throughout the rubber matrix.

The term rubber is used in its generic sense as comprehending both natural rubber and synthetic rubber, and compounds thereof, or in combination, such as used in the making of tires.

Thus, it will be seen that I have provided an anti-skid composition for tires, rubber floor tile, floor mats, cane and crutch tips, brake pedals, safety shoes for ladders, shoe soles and heels, and other tread surfaces, which composition is a critical one in that it provides an amazing increase of anti-skid characteristics on wet roads with negligible decrease in the life thereof as compared to a rubber composition without anti-skid particles; furthermore I have provided a rubber composition which is excellently suited for vehicle tires to be used during the spring, summer and fall on wet roads, in that remarkable anti-skid qualities are provided on such roads with no decrease in life—however, on snow and icy roads there is but little increase in anti-skid characteristics therefore not making it especially suitable for ice and snow and limiting its usefulness to spring, summer and fall driving. However, by suitably grooving the tires in such a way that the poor anti-skid characteristics during winter driving may be compensated for, it is possible to make the composition useful as an all-year tire, giving excellent anti-skid characteristics the year around without any noticeable decrease in the life, and therefore providing a substantial improvement over known anti-skid tires whose life is extremly limited.

While I have illustrated and described a certain specific embodiment of my invention, it will be apparent that this is by way of illustration only, and that various changes and modifications may be made within the contemplation of my invention and within the scope of the following claim.

I claim:

A vehicle tire tread comprising approximately 5 to 7 percent, by weight, of irregularly shaped wood chunks, the remainder being a rubber matrix, said wood chunks being substantially uniformly dispersed throughout the said rubber matrix and consisting substantially of a screen size between No. 8 and No. 30 standard mesh, said wood chunks being in the form of cubes and slivers of irregular shape having projecting corners and edges, and providing pronounced anti-skid characteristics on wet roads with no noticeable decrease in life.

References Cited in the file of this patent

UNITED STATES PATENTS

| | | |
|---|---|---|
| Re. 23,135 | Gapen | July 19, 1949 |
| 2,585,219 | Boyle | Feb. 12, 1952 |
| 2,607,386 | Pavlik | Aug. 19, 1952 |

FOREIGN PATENTS

| | | |
|---|---|---|
| 472,118 | Great Britain | Sept. 13, 1937 |

OTHER REFERENCES

The Vanderbilt Rubber Handbook, 9th edition, 1948. R. T. Vanderbilt Company, page 161.